United States Patent
Nadeau

(10) Patent No.: US 11,956,513 B2
(45) Date of Patent: Apr. 9, 2024

(54) AUTOMATED CALIBRATION OF QoE ASSESSMENT BETWEEN CONTENT DELIVERY NETWORK (CDN) ENTITIES

(71) Applicant: EXFO Inc., Quebec City (CA)

(72) Inventor: Sylvain Nadeau, Vaudreuil-Dorion (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 17/549,271

(22) Filed: Dec. 13, 2021

(65) Prior Publication Data

US 2022/0191597 A1 Jun. 16, 2022

Related U.S. Application Data

(60) Provisional application No. 63/125,071, filed on Dec. 14, 2020.

(51) Int. Cl.
*H04N 21/647* (2011.01)
*H04N 21/25* (2011.01)

(52) U.S. Cl.
CPC ..... *H04N 21/64738* (2013.01); *H04N 21/251* (2013.01)

(58) Field of Classification Search
None
See application file for complete search history.

(56) References Cited

U.S. PATENT DOCUMENTS

| | | | |
|---|---|---|---|
| 5,521,814 A | * | 5/1996 | Teran ............ B01J 19/0033 705/7.29 |
| 9,398,347 B2 | | 7/2016 | Jadallah et al. |
| 9,414,248 B2 | | 8/2016 | Kovvali et al. |
| 9,509,740 B2 | | 11/2016 | Ghazisaidi |
| 9,565,074 B2 | | 2/2017 | Lehane et al. |
| 9,686,173 B1 | | 6/2017 | Giordano et al. |

(Continued)

FOREIGN PATENT DOCUMENTS

| | | |
|---|---|---|
| CN | 202026435 U | 11/2011 |
| EP | 3672154 A1 | 6/2020 |

(Continued)

OTHER PUBLICATIONS

YouTube "Developer Policies", Mar. 26, 2019, [retrieved Jul. 10, 2023]. Retrieved from the Internet: <URL:https://developers.google.com/youtube/terms/developer-policies>. (Year: 2019).*

(Continued)

*Primary Examiner* — William J Kim
(74) *Attorney, Agent, or Firm* — Baratta Law PLLC; Lawrence A. Baratta, Jr.

(57) ABSTRACT

The present disclosure includes adjusting the QoE measurement obtained from a testing Content Delivery Network (CDN) entity to reflect accurately the QoE that would have been obtained from a reference video source from a content provider. A method includes performing a Quality of Experience, QoE, measurement from a first content source and adjusting the QoE measurement to reflect an estimate of a QoE measurement to a second content source. In this manner, it is possible to perform QoE measurements for an Over-the-Top, OTT, content provider without violating user policies that prohibit repeated requests.

20 Claims, 14 Drawing Sheets

(56) References Cited

U.S. PATENT DOCUMENTS

| | | | |
|---|---|---|---|
| 10,389,780 B2 | 8/2019 | Eshet et al. | |
| 10,542,446 B2* | 1/2020 | Ketonen | H04L 41/5009 |
| 10,637,715 B1 | 4/2020 | Vasilyev et al. | |
| 10,666,529 B2* | 5/2020 | Lundberg | H04L 41/5067 |
| 10,862,771 B2 | 12/2020 | Tomkins et al. | |
| 2013/0304934 A1 | 11/2013 | Joch et al. | |
| 2015/0312575 A1 | 10/2015 | Bryant | |
| 2019/0319853 A1 | 10/2019 | Casey et al. | |
| 2020/0099733 A1* | 3/2020 | Chu | G06N 5/003 |
| 2020/0235998 A1* | 7/2020 | Madhavan | H04L 43/0894 |
| 2020/0351374 A1* | 11/2020 | Eberle | G06F 21/31 |
| 2021/0176530 A1* | 6/2021 | Lobanov | H04N 21/4325 |
| 2021/0400104 A1 | 12/2021 | Nadeau et al. | |
| 2022/0239720 A1* | 7/2022 | Madanapalli | H04L 65/612 |

FOREIGN PATENT DOCUMENTS

| | | | |
|---|---|---|---|
| WO | 2014022017 A1 | 2/2014 | |
| WO | WO-2020227781 A1 * | 11/2020 | G06N 3/0445 |

OTHER PUBLICATIONS

'Is quote limit 1M or 50M for YouTube API v3? [duplicate]'. In StackOverflow [online]. Feb. 5, 2017 at 21:49, [retrieved Jul. 10, 2023]. Retrieved from the Internet : <URL: https://stackoverflow.com/questions/42057735/is-quota-limit-1m-or-50m-for-youtube-api-v3>. (Year: 2017).*
May 5, 2022, European Search Report for European Patent Application No. EP 21 21 3955.
Bouten et al., "QoE-Driven In-Network Optimization for Adaptive Video Streaming Based on Packet Sampling Measurements," Feb. 10, 2015, pp. 1-19.
Filho et al., "Network Fortune Cookie: Using Network Measurements to Predict Video Streaming Performance and QoE," Dec. 31, 2016, pp. 1-7.
BlazeMeter, "Load Testing Video Streaming with JMeter: Learn How," Jun. 5, 2018, pp. 1-7.
Apache JMeter, https://jmeter.apache.org/, 2019, pp. 1-2, accessed Dec. 10, 2020.
SamKnows, Factsheet on "Video Streaming," 2019, pp. 1-4, accessed Dec. 10, 2020.
Rutnik, "YouTube in numbers: Monthly views, most popular video and most fun stats!," Android Authority,Aug. 11, 2019, pp. 1-13.
Van Der Hoeven, "Running a Video Streaming Performance Test using Flood.io and UbikLoadPack," Jun. 23, 2020, pp. 1-9.
Wowza Media Systems, "Load test a Wowza Streaming Engine server," Originally Published on Sep. 1, 2020, Updated on Oct. 29, 2020, pp. 1-5.
PureLoad, "Load Test of CDN Edge and Streaming Video," https://www.pureload.com/solutions/cdn-edge-and-streaming-video/, pp. 1-5, accessed Dec. 10, 2020.
StreamTest, "Load Testing service," https://www.streamtest.net/loadtest, pp. 1-6, accessed Dec. 10, 2020.

* cited by examiner

| timestamp | value | 0_S | 1_M | 2_T | 3_W | 4_T | 5_F | 6_S | 0 | 1 | ... | 14 | 15 | 16 | 17 | 18 | 19 | 20 | 21 | 22 | 23 |
|---|---|---|---|---|---|---|---|---|---|---|---|---|---|---|---|---|---|---|---|---|---|
| 2020-01-01 00:00:00 | 0.014040 | 0 | 0 | 0 | 0 | 0 | 0 | 1 | 1 | 0 | ... | 0 | 0 | 0 | 0 | 0 | 0 | 0 | 0 | 0 | 0 |
| 2020-01-01 01:00:00 | -0.304574 | 0 | 0 | 0 | 0 | 0 | 0 | 1 | 0 | 1 | ... | 0 | 0 | 0 | 0 | 0 | 0 | 0 | 0 | 0 | 0 |
| 2020-01-01 02:00:00 | -0.503371 | 0 | 0 | 0 | 0 | 0 | 0 | 1 | 0 | 0 | ... | 0 | 0 | 0 | 0 | 0 | 0 | 0 | 0 | 0 | 0 |
| 2020-01-01 03:00:00 | -0.782878 | 0 | 0 | 0 | 0 | 0 | 0 | 1 | 0 | 0 | ... | 0 | 0 | 0 | 0 | 0 | 0 | 0 | 0 | 0 | 0 |
| 2020-01-01 04:00:00 | -0.541155 | 0 | 0 | 0 | 0 | 0 | 0 | 1 | 0 | 0 | ... | 0 | 0 | 0 | 0 | 0 | 0 | 0 | 0 | 0 | 0 |
| ... | ... | ... | ... | ... | ... | ... | ... | ... | ... | ... | ... | ... | ... | ... | ... | ... | ... | ... | ... | ... | ... |
| 2020-10-18 19:00:00 | -0.552826 | 0 | 0 | 0 | 0 | 0 | 0 | 1 | 0 | 0 | ... | 0 | 0 | 0 | 0 | 0 | 1 | 0 | 0 | 0 | 0 |
| 2020-10-18 20:00:00 | -0.535961 | 0 | 0 | 0 | 0 | 0 | 0 | 1 | 0 | 0 | ... | 0 | 0 | 0 | 0 | 0 | 0 | 1 | 0 | 0 | 0 |
| 2020-10-18 21:00:00 | -0.561036 | 0 | 0 | 0 | 0 | 0 | 0 | 1 | 0 | 0 | ... | 0 | 0 | 0 | 0 | 0 | 0 | 0 | 1 | 0 | 0 |
| 2020-10-18 22:00:00 | -0.479467 | 0 | 0 | 0 | 0 | 0 | 0 | 1 | 0 | 0 | ... | 0 | 0 | 0 | 0 | 0 | 0 | 0 | 0 | 1 | 0 |
| 2020-10-18 23:00:00 | -0.507435 | 0 | 0 | 0 | 0 | 0 | 0 | 1 | 0 | 0 | ... | 0 | 0 | 0 | 0 | 0 | 0 | 0 | 0 | 0 | 1 |

*FIG. 9*

|  timestamp | value |
|---|---|
| 2020-10-19 00:00:00 | -0.596951 |
| 2020-10-19 01:00:00 | -0.581017 |
| 2020-10-19 02:00:00 | -0.573474 |
| 2020-10-19 03:00:00 | -0.592527 |
| 2020-10-19 04:00:00 | -0.591233 |
| ... | ... |
| 2020-12-30 19:00:00 | -0.371727 |
| 2020-12-30 20:00:00 | -0.401556 |
| 2020-12-30 21:00:00 | -0.383022 |
| 2020-12-30 22:00:00 | -0.401841 |
| 2020-12-30 23:00:00 | -0.386834 |

FIG. 10

QoE adjustment factor

| timestamp | value |
|---|---|
| 2020-10-19 00:00:00 | -0.596951 |
| 2020-10-19 01:00:00 | -0.581017 |
| 2020-10-19 02:00:00 | -0.573474 |
| 2020-10-19 03:00:00 | -0.592527 |
| 2020-10-19 04:00:00 | -0.591233 |
| ... | ... |
| 2020-12-30 19:00:00 | -0.371727 |
| 2020-12-30 20:00:00 | -0.401556 |
| 2020-12-30 21:00:00 | -0.383022 |
| 2020-12-30 22:00:00 | -0.401841 |
| 2020-12-30 23:00:00 | -0.386834 |

+

QoE testing

| timestamp | value |
|---|---|
| 2020-10-19 00:00:00 | 4.371038 |
| 2020-10-19 01:00:00 | 4.184949 |
| 2020-10-19 02:00:00 | 4.539885 |
| 2020-10-19 03:00:00 | 4.423307 |
| 2020-10-19 04:00:00 | 4.861798 |
| ... | ... |
| 2020-12-30 19:00:00 | 4.406651 |
| 2020-12-30 20:00:00 | 4.506061 |
| 2020-12-30 21:00:00 | 4.148954 |
| 2020-12-30 22:00:00 | 4.090179 |
| 2020-12-30 23:00:00 | 4.036866 |

=

QoE testing adjusted

| timestamp | value |
|---|---|
| 2020-10-19 00:00:00 | 3.774087 |
| 2020-10-19 01:00:00 | 3.603932 |
| 2020-10-19 02:00:00 | 3.966411 |
| 2020-10-19 03:00:00 | 3.830779 |
| 2020-10-19 04:00:00 | 4.270565 |
| ... | ... |
| 2020-12-30 19:00:00 | 4.034924 |
| 2020-12-30 20:00:00 | 4.104505 |
| 2020-12-30 21:00:00 | 3.765932 |
| 2020-12-30 22:00:00 | 3.688339 |
| 2020-12-30 23:00:00 | 3.650031 |

*FIG. 12*

AUTOMATED CALIBRATION OF QoE ASSESSMENT BETWEEN CONTENT DELIVERY NETWORK (CDN) ENTITIES

CROSS-REFERENCE TO RELATED APPLICATION(S)

The present disclosure claims priority to U.S. Provisional Patent Application No. 63/125,071, filed Dec. 14, 2020, the contents of which are incorporated by reference in their entirety.

FIELD OF THE DISCLOSURE

The present disclosure generally relates to network monitoring. More particularly, the present disclosure relates to systems and methods for assessing the Quality of Experience (QoE) experienced by users of Over-The-Top (OTT) services, such as for monitoring QoE for video streaming.

BACKGROUND OF THE DISCLOSURE

Over-The-Top (OTT) video monitoring is required to detect and diagnose the root cause of video streaming problems as soon as they begin and identify their origin—whether inside or outside of networks. This is critical as video exceeds 65% of today's network traffic and will rise to over 90% in 5G networks by 2024. OTT video streaming issues are a primary source of network-related customer churn, a multimillion-dollar problem for network operators (also can be referred to interchangeably as service providers, wireless providers, etc.). Of course, customer churn is undesirable and network performance is a key differentiator.

Consumers blame their video QoE issues primarily on service providers, even though approximately half of all video quality issues originate outside of the service providers' networks and their control. Specifically, Applicant has performed a survey in 2020 that showed about half of video quality issues are due to issues in a CDN network or a customer network (e.g., Wi-Fi), not in the service provider. OTT QoE is difficult to monitor in real-time or to correlate with an easier measurement of Quality of Service (QoS). Further, it can take significant time and personnel to troubleshoot and resolve OTT quality issues. As a result, service providers have high volumes of churn and are unable to effectively monetize OTT video services and leverage QoE as an essential differentiator (and blame shifter). In turn, revenue losses and higher customer acquisition costs increase as the provider's reputation suffers—even if the issues stem from a customer device, a poor home Wi-Fi network, or a content provider's data center issue.

Mobile network operators, internet service providers, and content delivery providers need to detect, segment, classify and diagnose the root cause of video streaming problems as soon as they begin. It is important for them to pinpoint whether problems like freezing, buffering, or lagging come from their network, the video platform, the user's device, or a video provider such as YouTube™ or Netflix™.

Legacy video monitoring solutions are generally expensive, compute-intensive, and tailored to content delivery applications. The industry needs real-time video monitoring that helps service providers overcome network issues, where the majority of issues originate. Many tools are currently available to obtain video streaming QoE test results, such as, for example, SamKnows, Apache JMeter™, Flood.io, Ubik-LoadPack, PureLoad, Wowza, StreamTest which all provide load testing services. For example, SamKnows offers several QoE tests, with different emphasis including gaming, social media, video conferencing, video streaming, CDN measurements and web browsing. Their video streaming QoE test includes data from Netflix, YouTube, iPlayer, Hulu, and Multicast IPTV. Sam Knows' measurements for video streaming consider the bit rate that is reliably streamed, the startup delay (the time taken to download two seconds of video), the Transmission Control Protocol (TCP) connection time, the number of stalls and their duration, and the downstream throughput that is achieved.

Applicant has also proposed a video streaming QoE test. In particular, an "Over-The-Top Media Service Testing And QoE Issues Isolation" method and system are described in U.S. patent application Ser. No. 17/351,368, filed Jun. 18, 2021, and a "VIDEO STREAMING OVER HAS TESTING WITH TRAFFIC PATTERN MODEL" method and system are described in U.S. 63/212,153, filed Jun. 18, 2021, both of which are hereby incorporated by reference. These methods reliably measure the OTT Video QoE of a selected quality (resolution, frame rate, etc.). These methods select a reference or source video Uniform Resource Locator (URL) to perform the QoE assessment. In some embodiments, videos hosted by YouTube are used to reflect the real user experience (same delivery path, caching, etc.). However, YouTube automatically detects requests coming from network computers and the YouTube Terms of service prevent repeated requests made to YouTube's Application Programming Interface (API). It is therefore not possible to perform a significant number of requests to YouTube's API without breaking usage policies and being blocked. As described herein, YouTube is an example content provider (also referred to as video provider, OTT provider, etc.). Of course, this same problem, i.e., significant repeated requests, exists with other content providers (e.g., Netflix, Hulu, Disney+, Tik Tok, etc.).

There is a need to obtain reliable QoE test results without querying the video source (i.e., content provider) directly.

BRIEF SUMMARY OF THE DISCLOSURE

The present disclosure includes systems and methods to adjust the QoE measurement obtained from a testing Content Delivery Network (CDN) entity to reflect accurately the QoE that would have been obtained from a reference video source from a content provider, for example, YouTube.

In one embodiment, adjusting includes at least one of a learning process, an adjustment process, and a monitoring process. The objective of the learning process is to determine performance (e.g., measured QoE) for a reference video source and a CDN, at various times and locations.

In one embodiment, the method includes measuring a measured QoE from a reference video source and a testing CDN at multiple time and location instances; learning the performance difference between the reference video source QoE and the testing CDN QoE as a function of time and location; and adjusting the measured testing CDN QoE using the performance difference.

A method for adjusting the QoE measurement obtained from a testing Content Delivery Network (CDN) entity (edge-cache) to reflect the QoE that would have been obtained from a reference video source (e.g., YouTube). The learning process includes, for each region associated to the reference and testing CDN, take QoE measurements per time interval from both the reference CDN and the testing CDN; calculate the difference between the reference and testing QoE measurements for each time internal: QoE delta=QoE reference−QoE testing; create a QoE delta time series with timestamp and QoE delta; build a predictive model from the QoE delta time series with the following parameters: time value; QoE delta value. The adjustment process uses the predictive model of the corresponding region to adjust the measured QoE from the testing CDN. The monitoring process ensures than the predictive model remains accurate over time while the network behavior might change.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is a table of simulated data, including a QoE delta time series with timestamp and QoE delta.

FIG. 10 is a table of simulated data, including the QoE adjustment factor obtained from the predictive model for each timestamp.

FIG. 12 includes three tables of simulated data, including the QoE testing adjusted=QoE testing+QoE adjustment factor.

DETAILED DESCRIPTION OF THE DISCLOSURE

The present disclosure includes systems and methods to adjust the QoE measurement obtained from a testing Content Delivery Network (CDN) entity to reflect accurately the QoE that would have been obtained from another CDN or content provider, for example, YouTube. Again, YouTube as referenced herein is an example content provider. Those skilled in the art will appreciate other content providers are also contemplated herewith. That is, the present disclosure includes QoE measurements from a first source (e.g., a CDN) and extrapolating that result to reflect what it would have been from a second source (e.g., the content provider, another CDN, etc.). A use case of this approach is to provide QoE measurements in a manner that does not overwhelm a content provider and create issues (service violation, blocking, etc.).

YouTube and other content providers deliver video services and other content with Content Delivery Network (CDN) entities to improve performance and locally manage requests (caching, firewall, etc.). As is known in the art, a CDN is a distributed network of proxies and associated data centers, to provide better availability and performance by distributing content spatially relative to end users. It would therefore be possible to use CDNs, such as Cloudflare, Amazon CloudFront, etc., to stream OTT video instead of streaming directly from YouTube or another content provider. Unfortunately, the measured QoE would then not precisely reflect the YouTube video delivery performance. The QoE results might be slightly different since the video are not streamed from the same origin.

Figure 1:
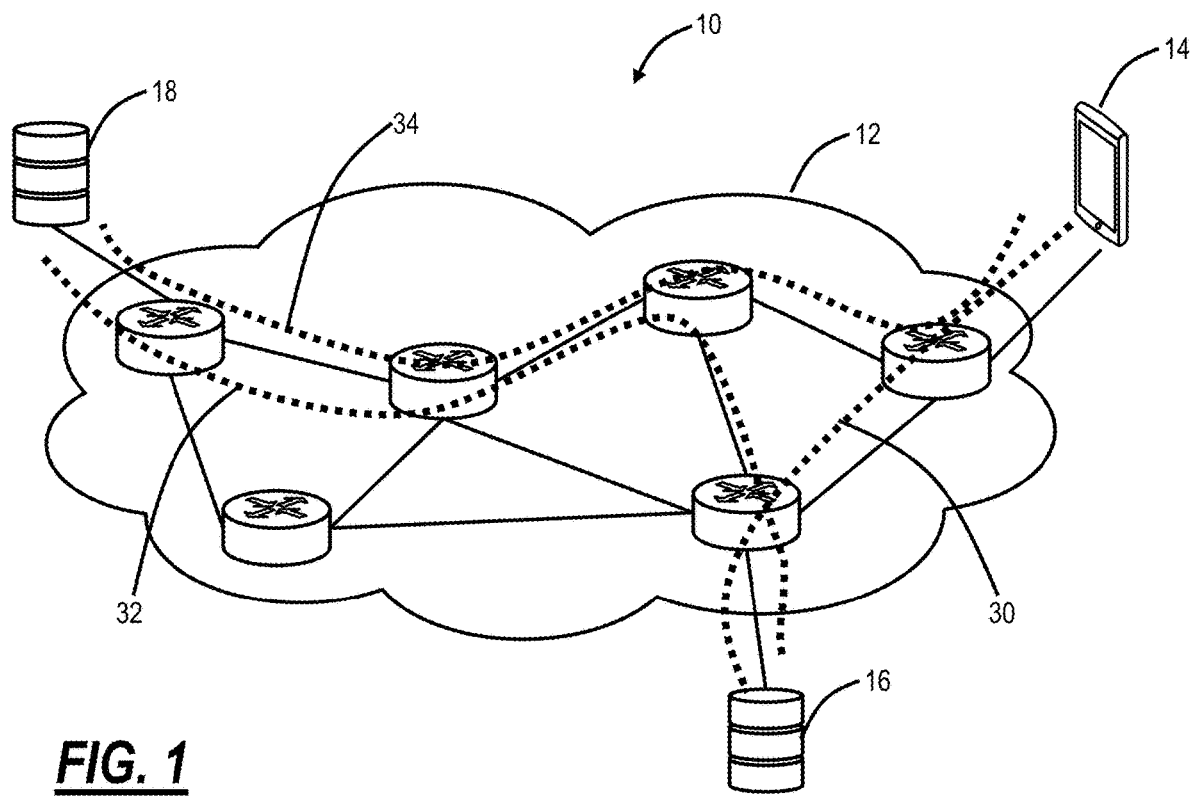
FIG. 1 is a network diagram of an example network that includes a service provider network and a user device connected thereto.

FIG. 1 is a network diagram of an example network 10 that includes a service provider network 12 and a user device 14 connected thereto. Also, there are two content sources 16, 18 connected to the service provider network 12. The content sources 16, 18 can be CDN entities hosting content, video providers, content providers, OTT providers, etc. For example, the content source 18 can be YouTube while the content source 16 can be a CDN entity hosting content from YouTube. The network 10 is presented for illustration purposes and those skilled in the art will recognize various embodiments are contemplated. Also, various components are omitted for simplicity. There can be many more content sources 16, 18. Also, the user device 14 can be located in another network (not shown) such as home Wi-Fi or the like. Again, as mentioned above, QoE issues can be either in the service provider network 12 or external to the service provider network 12, such as at the content sources 16, 18 and associated networks or at the user device 14 and associated network.

Figure 2:
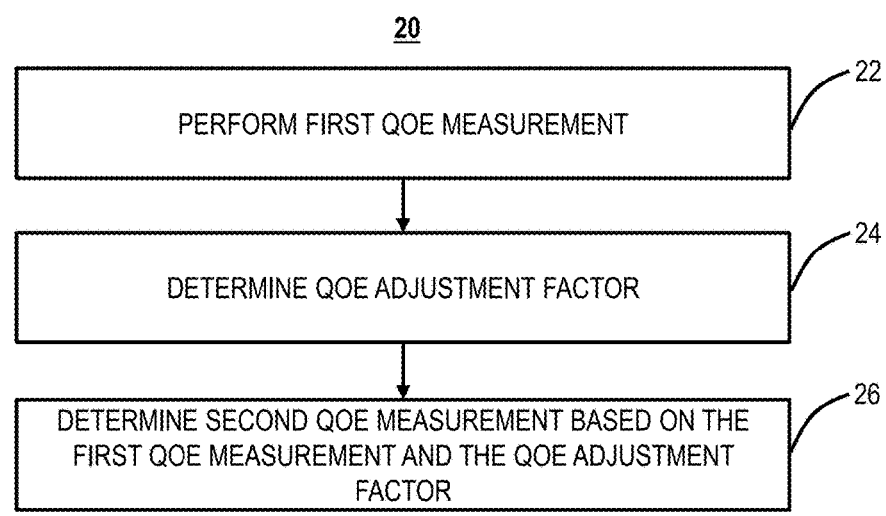
FIG. 2 is a flowchart of a process to adjust the QoE measurement obtained from a first CDN entity to reflect accurately the QoE that would have been obtained from another CDN or content provider.

FIG. 2 is a flowchart of a process 20 to adjust the QoE measurement obtained from a first CDN entity to reflect accurately the QoE that would have been obtained from another CDN or content provider. With reference to FIG. 1 as well, the process 20 includes a first QoE measurement 30 between the user device 14 and the content source 16 (step 22), a determination of a QoE adjustment factor 32 between the content source 16 and the content source 18 (step 24), and a determination of a second QoE measurement 34 based on the first QoE measurement 30 and the QoE adjustment factor 32. The QoE measurements 30, 32 can utilize any approach including the aforementioned OTT video QoE approaches. The QoE adjustment factor 32 is utilized to allow a QoE measurement from the user device 14 to the content source 16 (e.g., CDN) to accurately substitute for a QoE measurement from the user device 14 to the content source 18 (e.g., content provider such as YouTube).

One use case for this approach is to avoid traffic surges to content providers for QoE testing. The solution to reflect accurately the QoE from a reference CDN such as a content provider (e.g., YouTube) when testing with another CDN is to learn the performance difference between the reference CDN, and the testing CDN as a function of time and location, and then adjust the measured QoE accordingly. Of course, the approach described herein can be used to determine a QoE measurement for any other use case.

Figure 3:
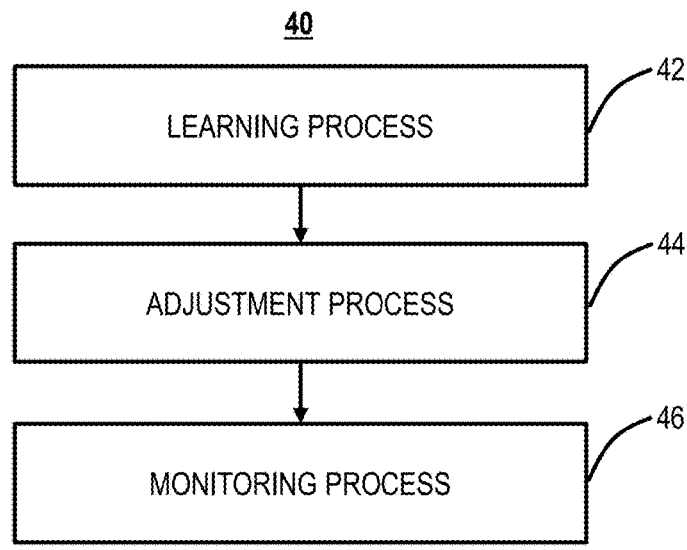
FIG. 3 is a flowchart of a QoE adjustment factor process that includes a learning process, an adjustment process, and a monitoring process.

To achieve this accurate substitution, the present disclosure includes the QoE adjustment factor 32 including a determination of this value and ongoing monitoring to assure its accuracy. FIG. 3 is a flowchart of a QoE adjustment factor 32 process 40 that includes a learning process 42, an adjustment process 44, and a monitoring process 46. The process 40 can be implemented in the network 10, such as by various QoE measurement between entities and region. As described herein, a region can be a portion or subset of the service provider network 12. Also, as described herein, a reference CDN is used to refer to a content provider, CDN, video provider, etc. The testing CDN is used to refer to a CDN that an actual QoE measurement is performed to, such as with a user device 14. The reference CDN is the location where the actual QoE measurement is extrapolated to using the QoE adjustment factor 32.

Figure 4:
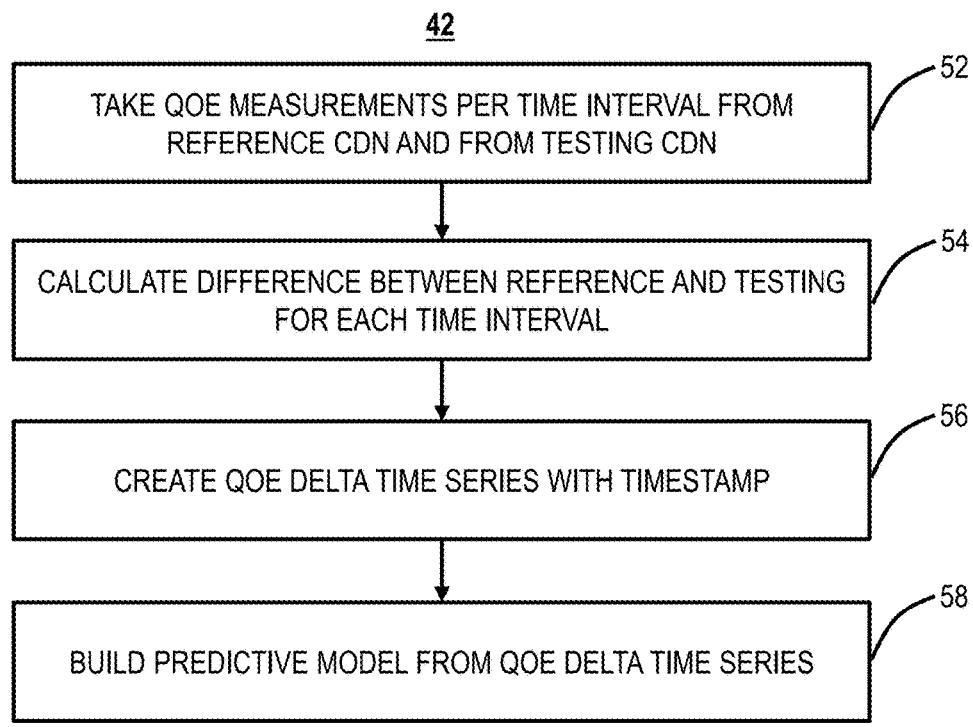
FIG. 4 is a flowchart of details of the learning process from FIG. 3.

FIG. 4 is a flowchart of details of the learning process 42. The learning process 42 takes periodic QoE measurements from both the reference CDN and the testing CDN. The number of measurements is set low so as not to be blocked by the reference CDN (e.g., YouTube). The QoE measurements are accompanied with timestamp and location information. The objective of the learning process 42 is to develop the QoE adjustment factor 32. The QoE adjustment factor 32 includes different values (a delta) for different time intervals (e.g., every hour or any other value). The main steps of the learning process are the following for each region associated to the reference CDN and testing CDN:

Step 52. Take QoE measurements per time interval from both the reference CDN and the testing CDN (e.g., every hour). This approach is to take QoE measurements from the content source 16 and from the content source 18, providing two values.

Step 54. Calculate the difference between the reference and testing QoE measurements for each time internal: QoE delta=QoE reference−QoE testing. The difference between these two values can be the QoE adjustment factor 32.

Step 56. Create a QoE delta time series with a timestamp and a QoE delta;

Step 58. Build a predictive model from the QoE delta time series with the following parameters: time of day value (e.g., time=0..23 if the time interval is hour-based); day of the week value (e.g., day=0, Sunday; day=1, Monday, etc.); QoE delta value (e.g., delta=−0.123).

Note, in another embodiment, it can be possible to measure QoE between the content sources 16, 18.

This approach takes into account the intrinsic periodicity of 1-day that typically characterize network behavior. As traffic increases rapidly in the morning, network performance measures deteriorate according to the same trend. Then, at the end of the day, when traffic drops significantly, performance measures return to their ideal values. The learning process should last at least one week, ideally much more to properly train the model. Also, additional parameters could be added to improve the model prediction such as holidays, special events, etc.

The output of the learning process 42 is a time-series which includes a QoE delta for each time interval. Then, the adjustment process 44 uses the predictive model of the corresponding region to adjust the measured QoE from the testing CDN, to reflect an estimate of the measured QoE from the reference CDN.

Figure 5:
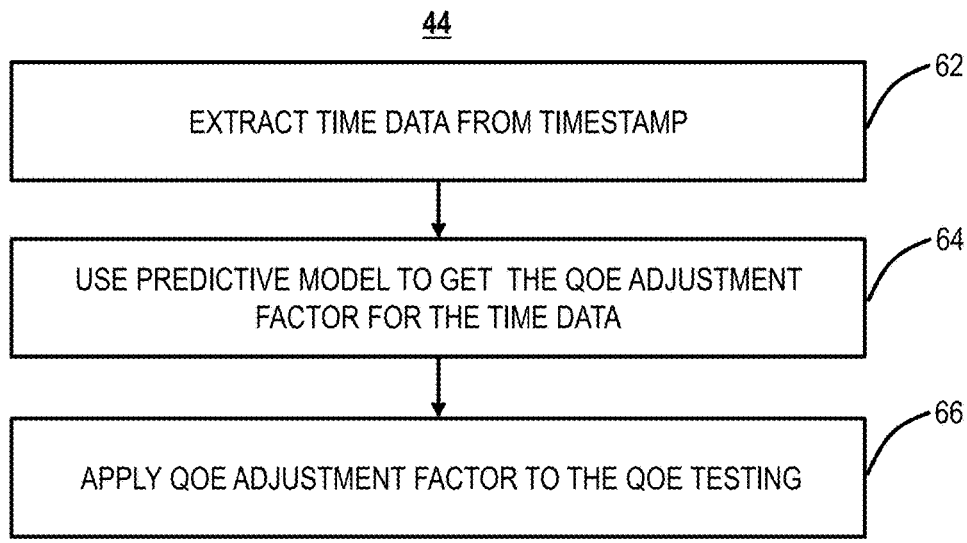
FIG. 5 is a flowchart of details of the adjustment process from FIG. 3.

FIG. 5 is a flowchart of details of the adjustment process 44. The main steps of the adjustment process 46 are the following for each region associated to the reference and testing CDN, and for each QoE measured with a testing CDN:

Step 62. Extract from the timestamp the current time of day value (e.g., hour=2) and the day of the week (e.g., day=0, Sunday);

Step 64. Use the predictive model to get the QoE adjustment factor corresponding to the time of day, the day of the week;

Step 66. Apply the QoE adjustment factor to the QoE measurement to the testing CDN, where QoE measurement adjusted=QoE testing+QoE adjustment factor And the QoE measurement adjusted corresponds to a QoE measurement to the reference CDN.

Figure 6:
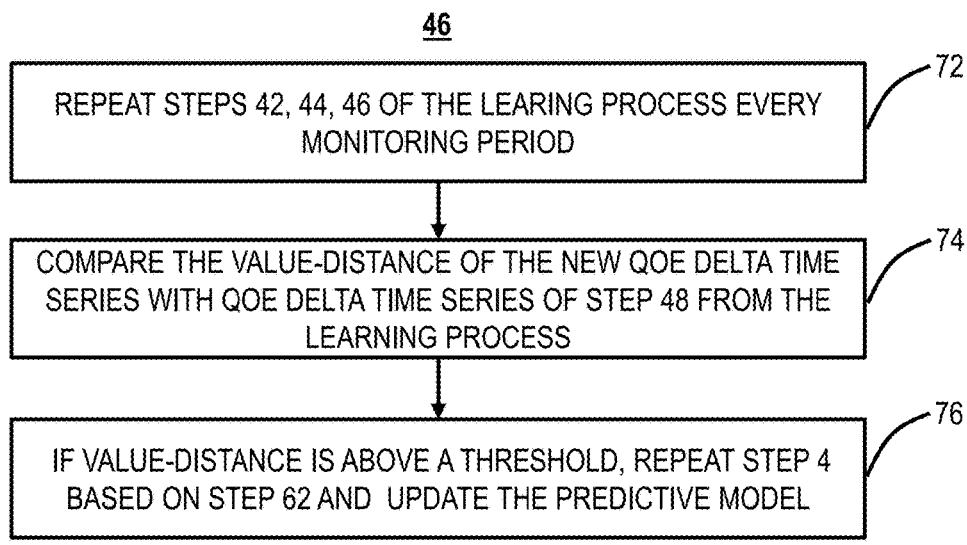
FIG. 6 is a flowchart of details of the monitoring process from FIG. 3.

FIG. 6 is a flowchart of details of the monitoring process 46. The monitoring process 46 ensures than the predictive model remains accurate over time while the network 12 behavior might change. The main steps of the monitoring process 46 are the following for each region associated to the reference and testing CDN:

Step 72. Execute the steps 52, 54, 56 of the learning process 42 every monitoring period (e.g., every month or the like);

Step 74. Compare the Euclidean distance of the new QoE delta time series with the previous one;

Step 76. If the distance is above a threshold, complete the learning process (step 58) and update the predictive model.

Main Technical Advantages

The main technical advantages of the various processes are offering a non-linear adjustment of QoE measurements better reflecting real network performance. It also automatically adjusts itself over time as network behavior evolve. In an embodiment, the proposed implementation leverages a neural network such as a multivariate Long-Short-Term-Memory (LSTM) with auto-encoder. A transformer or other supervised learning techniques could also be used.

Simulation

A simulation of the learning and adjustment processes 42, 44 is described as follows.

Figure 7:
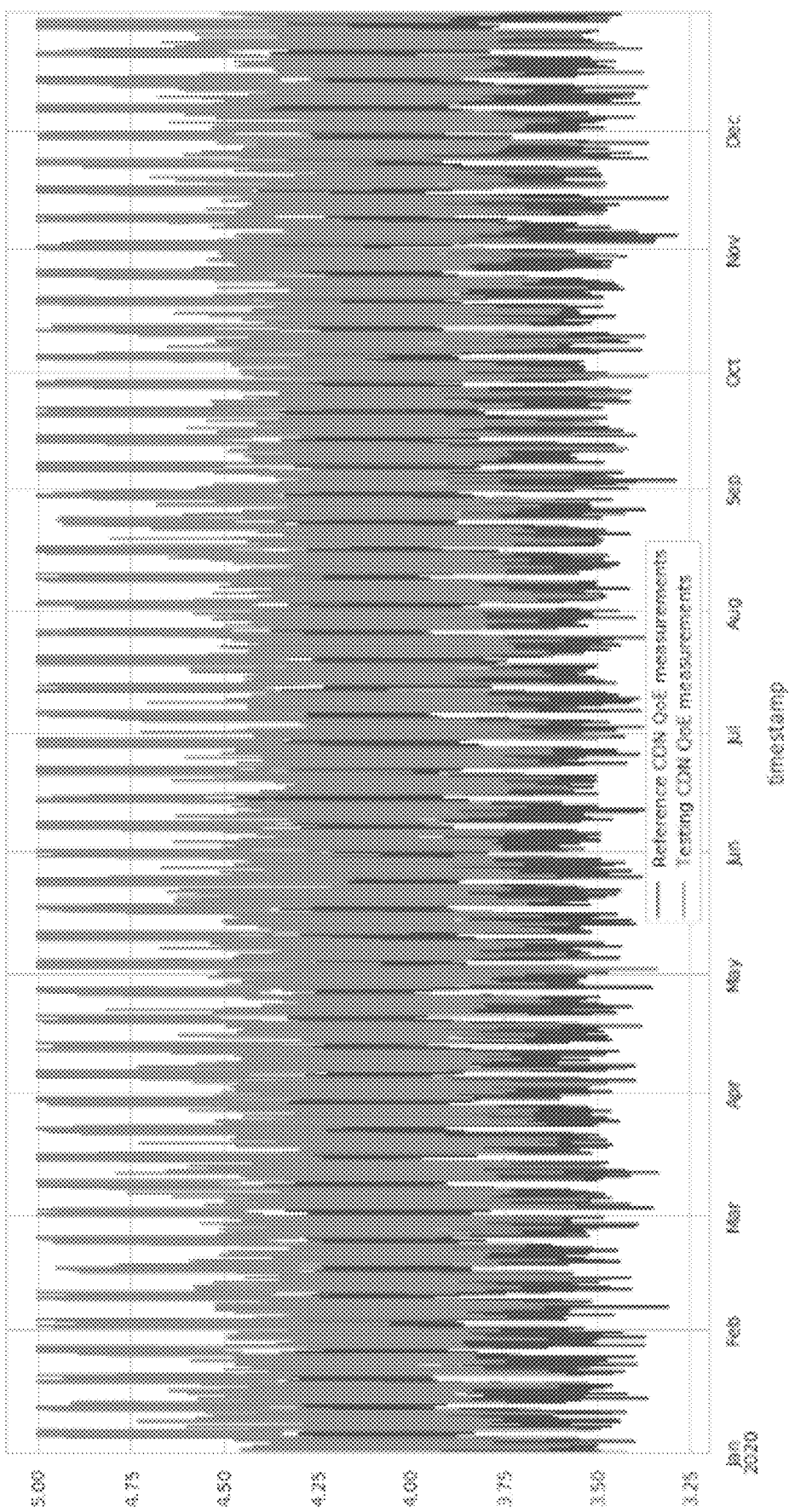
FIG. 7 is a graphical representation of simulated data, including resulting QoE measurement time series.
Figure 8:
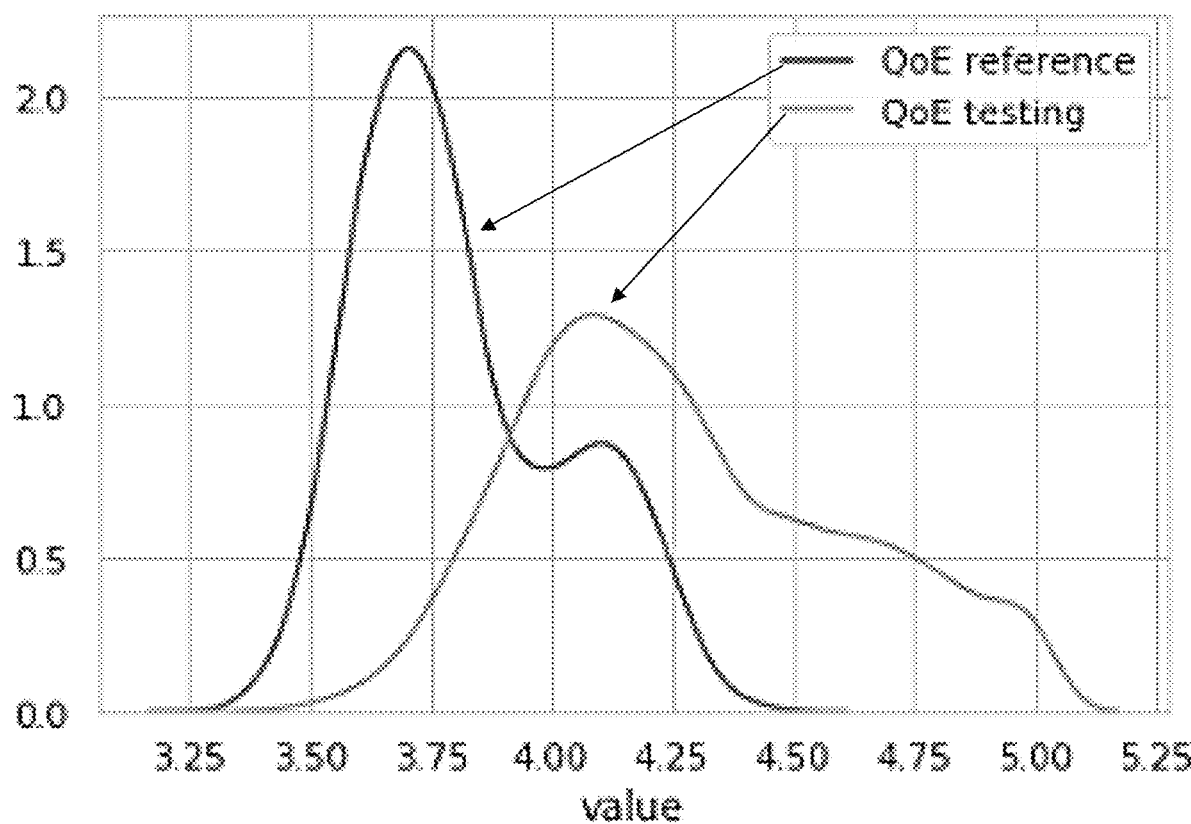
FIG. 8 is a graphical representation of simulated data, including QoE score distribution of QoE reference and QoE testing measurements.

Synthetic reference CDN and testing CDN QoE measurements were generated with a time interval of 1 hour for a period of 1 year. Each series of measurements has a distribution of random QoE measurement values according to an Absolute Category Rating (ACR) score scale (QoE reference: mean=3.7, std=0.1; QoE reference: mean=4.1, std=0.2). Also, a daily variation of +/−1 points on the ACR score scale is introduced on each series of measurements following a sine wave. The resulting QoE measurement time series are shown in FIG. 7. The QoE score distribution of QoE reference and QoE testing measurements is shown in FIG. 8.

The learning process steps 52, 54 56 created a QoE delta time series with timestamp and QoE delta (Table provided in FIG. 9). The time of day value and day of the week value have been one-hot encoded. This becomes the inputs to the multivariate Long-Short-Term-Memory (LSTM) with auto-encoder at step 58 (e.g., first 80% is used to train, last 20% to test).

Figure 11:
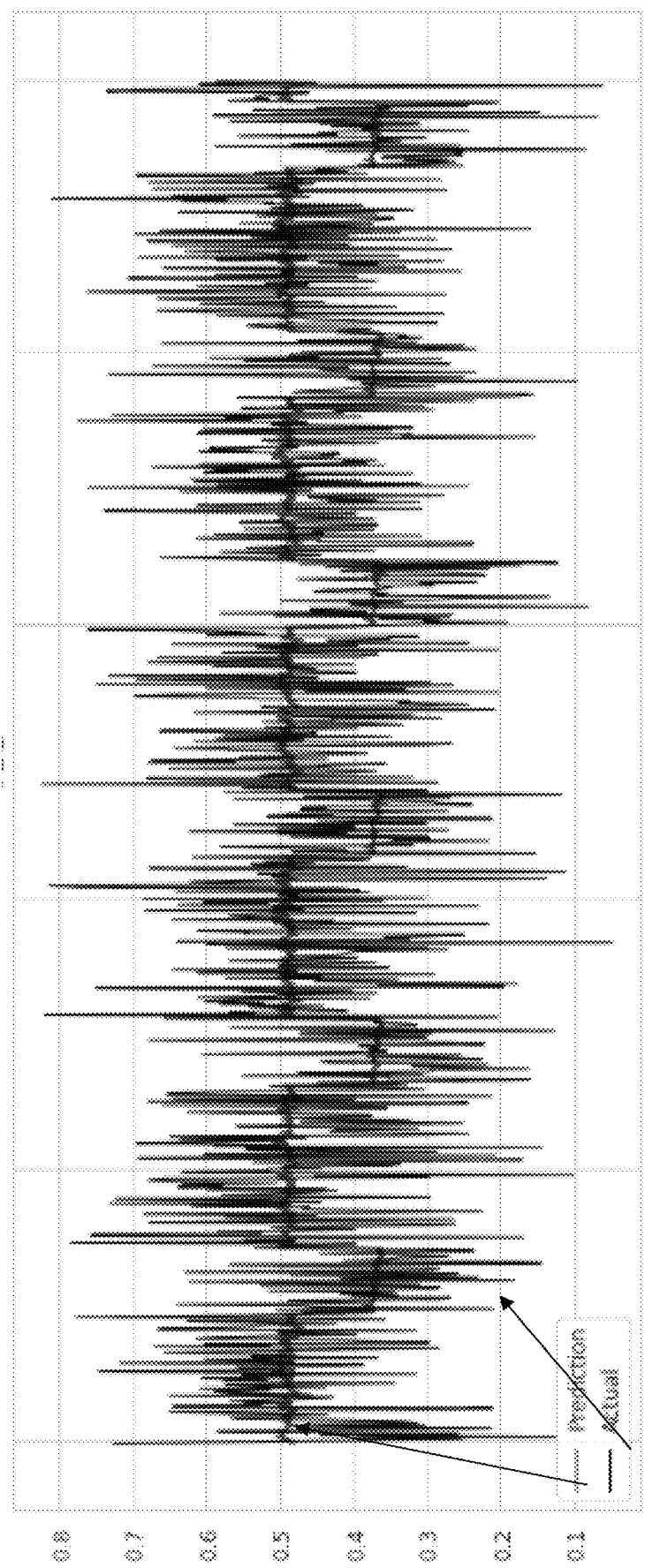
FIG. 11 is a graphical representation of simulated data, including the predicted QoE adjustment factor and the actual difference between the QoE reference and QoE testing (QoE delta).

The adjustment process steps 62, 64 use the predictive model to get the QoE adjustment factor corresponding to the time of day, the day of the week. The table of FIG. 10 shows the QoE adjustment factor obtained from the predictive model for each timestamp. FIG. 11 shows the difference between the predicted QoE adjustment factor and the actual difference between the QoE reference and QoE testing (QoE delta).

Step 66 applies the equation: QoE testing adjusted=QoE testing+QoE adjustment factor, as shown in FIG. 12.

Figure 13:
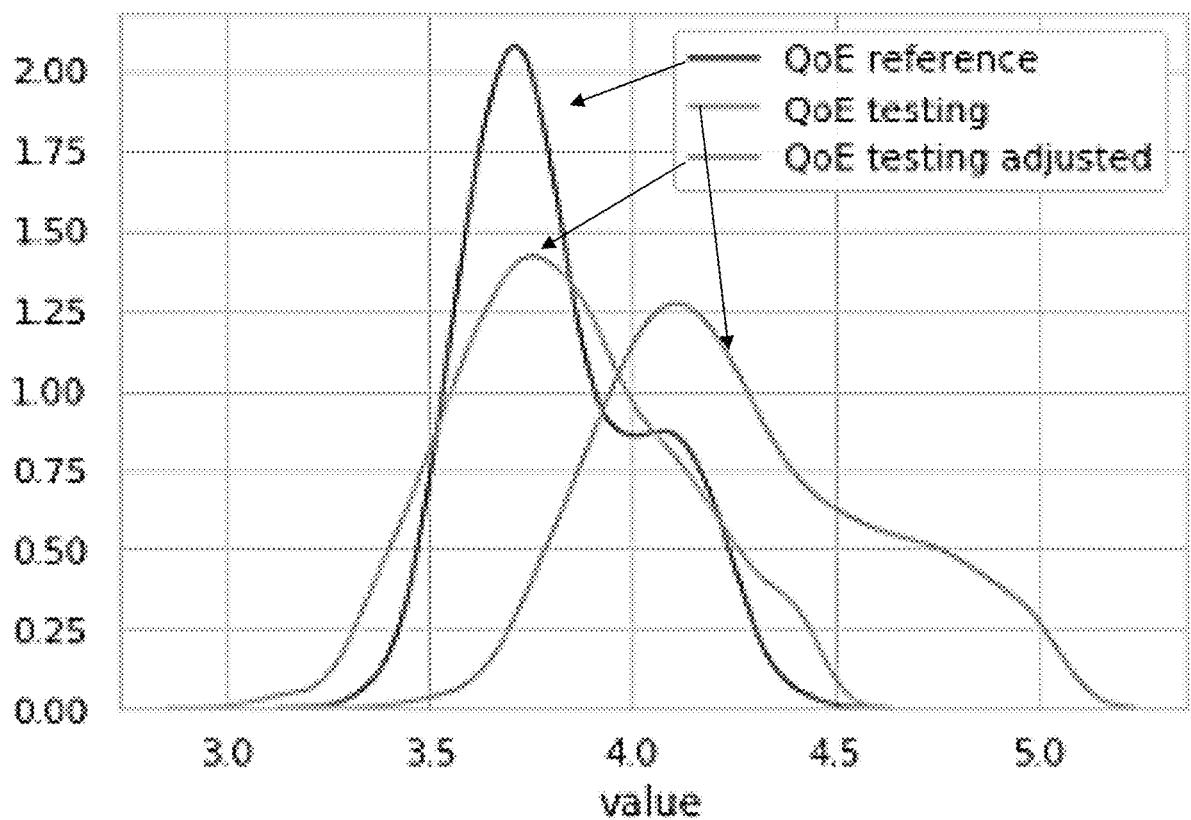
FIG. 13 is a graphical representation of simulated data, including the QoE score distribution of QoE reference, QoE testing and QoE testing adjusted measurements.

The QoE score distribution of QoE reference, QoE testing and QoE testing adjusted measurements is shown in FIG. 13. Note that this simulation demonstrates the functionality of, not the performance of the method and system. Using synthetic QoE generated from random processes degrades the performance of the machine-learning system. By construction, a random variable cannot be learned.

EXAMPLE

Figure 14:
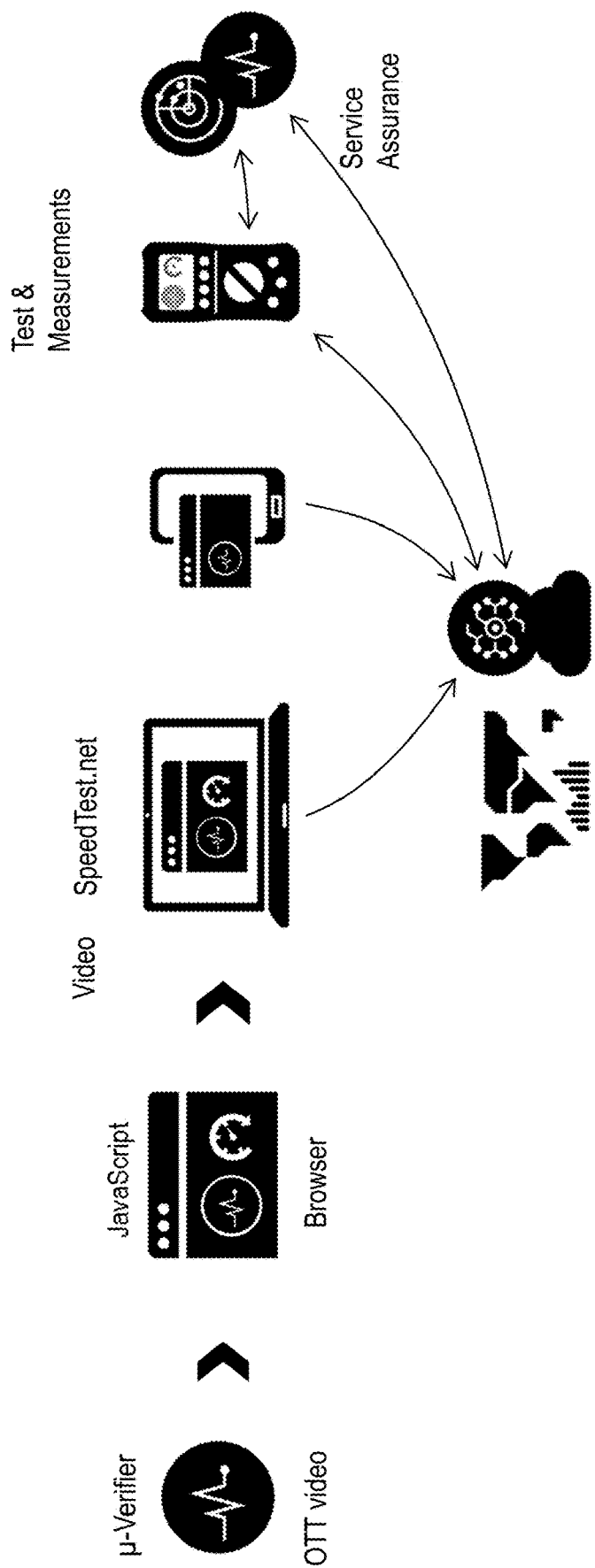
FIG. 14 is a graphical representation of the systems which interact together to provide network operators with reliable data and information about their networks.

FIG. 14 is a graphical representation of the systems which interact together to provide mobile network operators, internet service providers and content delivery providers with reliable data and information about their networks. This component is accessible via a web browser, for example through a JavaScript™ script running on a webpage. The webpage can be accessed by a user from any type of internet-connected device, including a personal computer running Windows or Mac, any Android, Apple, Google, or other devices, including phones, tablets, watches, etc. In addition to these video monitoring tests, the operators and providers can receive data from physical and transport and datacom test and measurement devices as well as from other service assurance monitoring devices. Additionally, all of these data sources can communicate with a data aggregator and analytics module which finds correlations and issues which can then be reported in a more succinct and action-related compilation to the operators and providers.

Figure 15:
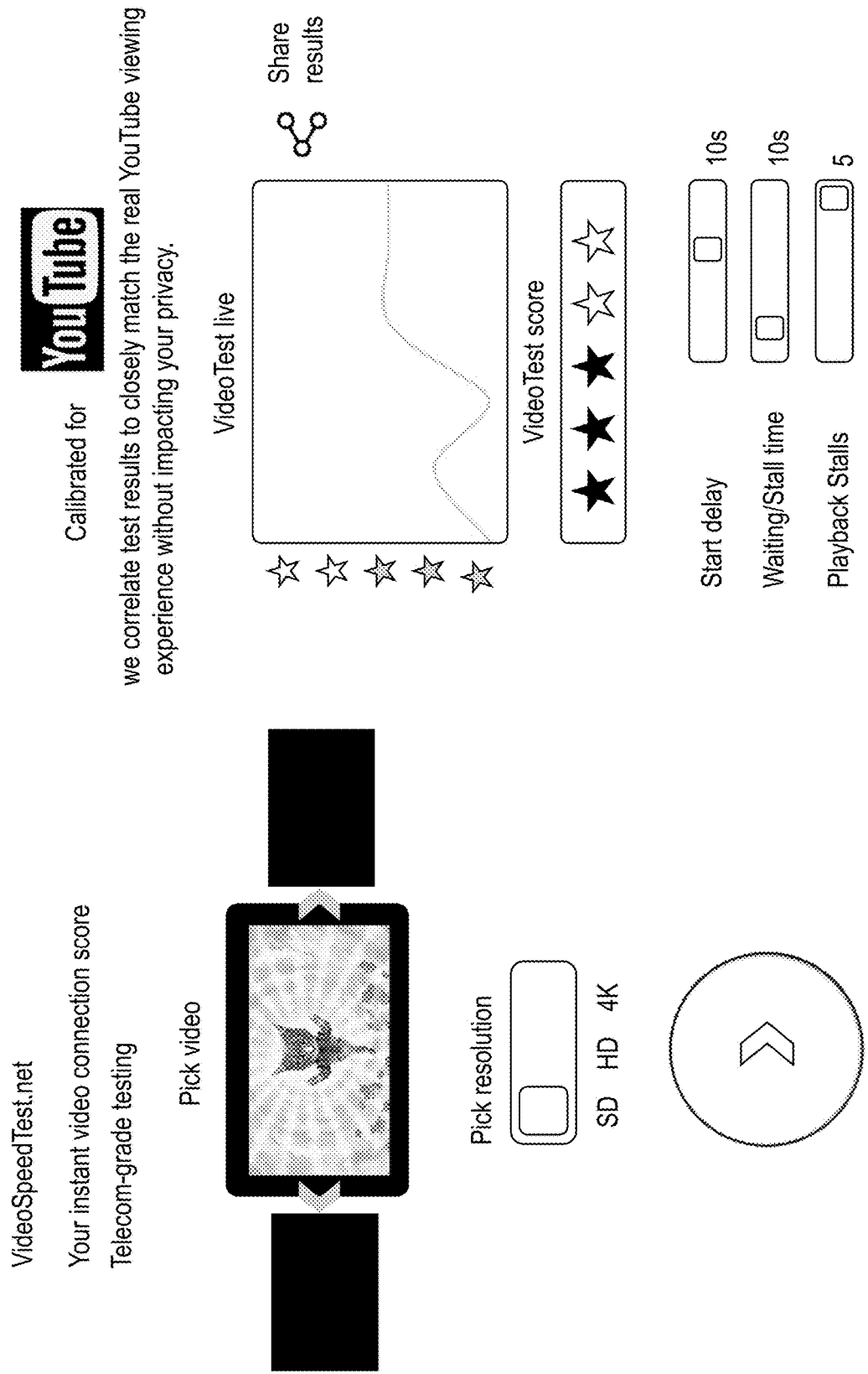
FIG. 15 is a graphical representation of the components of a user-accessible webpage for testing a video streaming service using the method and system presented herein.

FIG. 15 is a graphical representation of the components of a user-accessible webpage for testing a video streaming service using the method and system presented herein. On the left-hand side, the user selects a video to watch and with which the test will be conducted. A resolution for the video (SD, HD, 4K, for example) is selected. The play button triggers the test. In this example, the test is calibrated for YouTube, meaning that it is correlated to closely match the real YouTube viewing experience without impacting on the user's privacy and without breaking YouTube's terms of reference.

On the right-hand side, the live test results are shown. A graph of the performance over the duration of the test is shown. On the Y-axis, stars are lit up when the score level reaches a sufficient level. An overall video test score is shown below the graph, using a 5-star rating. Results are further expressed in terms of Start Delay, Waiting Time and Playback Stalls using sliding bars and a numerical value.

The embodiments described above are intended to be exemplary only. The scope of the invention is therefore intended to be limited solely by the appended claims.

Method

Figure 16:
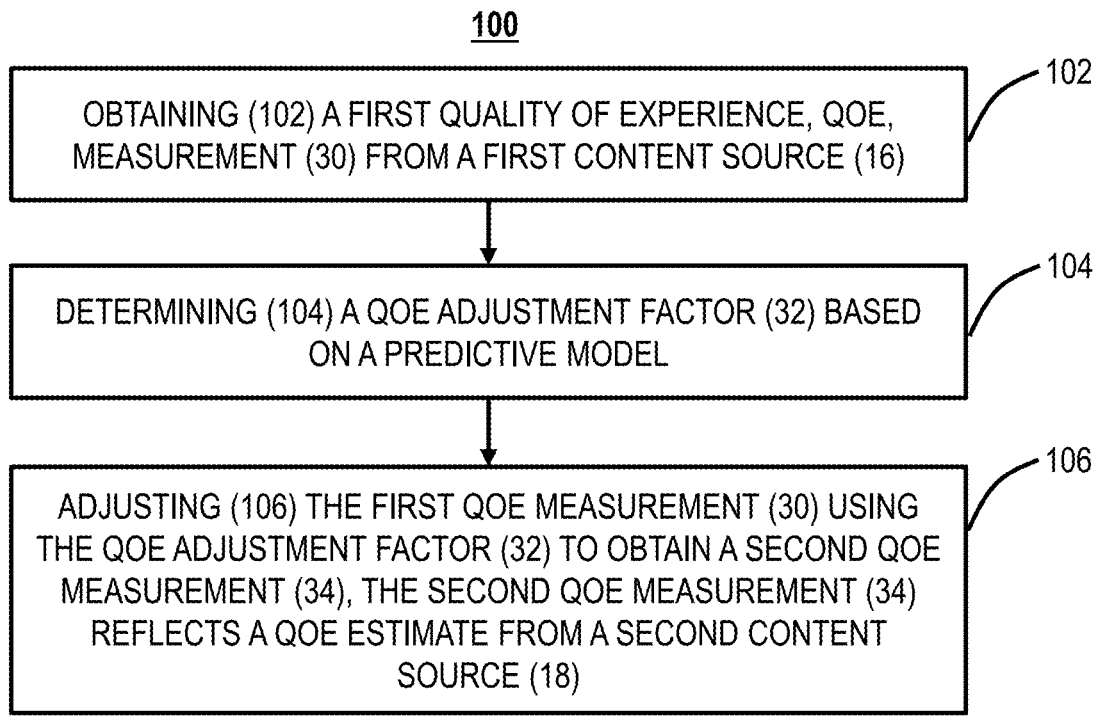
FIG. 16 is a flowchart of a process to adjust the QoE measurement obtained from a testing Content Delivery Network (CDN) entity to reflect accurately the QoE that would have been obtained from another entity.

FIG. 16 is a flowchart of a process 100 to adjust the QoE measurement obtained from a testing Content Delivery Network (CDN) entity to reflect accurately the QoE that would have been obtained from another entity. The process 100 can be realized as a method having steps, via a processing system including at least one processor and memory with instructions that, when executed, cause the at least one processor to implement the steps, and a non-transitory computer-readable medium having instructions stored thereon for programming at least one processor to perform the steps.

The process 100 includes obtaining (step 102) a first Quality of Experience, QoE, measurement 30 from a first content source 16; determining (step 104) a QoE adjustment factor 32 based on a predictive model; and adjusting (step 106) the first QoE measurement 30 using the QoE adjustment factor 32 to obtain a second QoE measurement 34, the second QoE measurement 34 reflects a QoE estimate from a second content source 18.

The first content source 16 can a Content Delivery Network, CDN, entity, and the second content source 18 can be an Over-the-Top, OTT, content provider. The QoE adjustment factor includes a delta value for a corresponding time interval and day, such that the delta value is applied to the first QoE measurement 30 to estimate the second QoE measurement 34.

The predictive model is determined based on a learning process 42 to obtain delta values for time intervals and days, and, optionally, a monitoring process 46, that adjusts the delta values over time. The learning process 42 can take periodic QoE measurements from both the first content source 16 and the second content source 18 including timestamp and location information. The learning process 42 can be performed for a plurality of regions in a network, both from the first content source 16 and from the second content source 18.

The learning process 42 can include steps of obtaining QoE measurements from the first content source 16 and from the second content source 18 at various time intervals and days; learning a performance difference between the first content source 16 and the second content source 18 as a function of time and location; and adjusting the predictive model based on the performance difference.

The learning process 42 can include steps of obtaining 52 QoE measurements from the first content source 16 and from the second content source 18 at various time intervals and days; determining 54 differences between the QoE measurements; and creating 56 a time series with the differences. The learning process 42 can include steps of taking QoE measurements per time interval from both from the first content source 16 and from the second content source 18; calculating a difference between QoE measurements for each time internal: QoE delta=QoE reference−QoE testing; creating a QoE delta time series with timestamp and QoE delta; and building a predictive model from the QoE delta time series with parameters including a time value and QoE delta value. The time value can be at least one of a time of day value and a day of the week value.

The monitoring process 46 ensures than the predictive model remains accurate over time while network behavior changes. The monitoring process 46 can include steps of periodically repeating portions of the learning process and comparing values in the predictive model and updating the predictive model based thereon. The QoE adjustment factor 32 can be based on a region of a plurality of regions.

Example Processing Device Architecture

Figure 17:
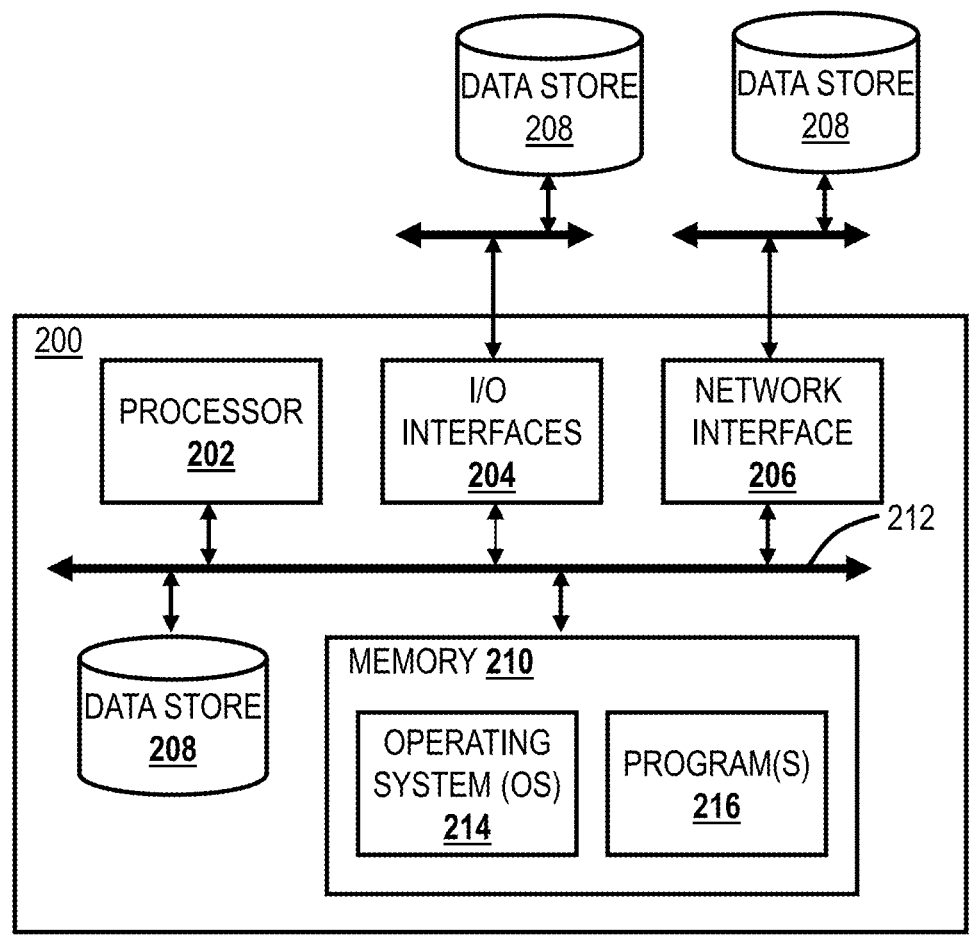
FIG. 17 is a block diagram of a processing device, which may be used to implement any of the processes and functionality described herein.

FIG. 17 is a block diagram of a processing device 200, which may be used to implement any of the processes and functionality described herein. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 17 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:
responsive to a requirement to test an Over-the-Top (OTT) content provider by one of a user, a mobile network operator, an Internet service provider, and a content delivery provider, performing a first Quality of Experience (QoE) measurement from a first content source to obtain a QoE measurement from a second content source that is the OTT content provider, wherein the first QoE measurement includes one or more of download time from the first content source, connection time to the first content source, number of stalls and their duration from the first content source, throughput from the first content source, and waiting time, wherein the second content source is different from the first content source, and wherein the second content source has user policies prohibiting repeated requests for the QoE measurements from the user device;
determining a QoE adjustment factor based on a predictive model, wherein the QoE adjustment factor includes values to adjust the first QoE measurement to accurately substitute for the QoE measurement from the second content source that is the OTT content provider, wherein the values of the QoE adjustment factor are different values for different time intervals and are monitored and adjusted over time;
adjusting the first QoE measurement using the QoE adjustment factor to obtain a second QoE measurement, the second QoE measurement reflects a QoE estimate from the second content source based on the first QoE measurement from the first content source, thereby complying with the user policies of the second content source; and
providing a graphical representation of the test with the second QoE measurement as the QoE estimate instead of performing the QoE measurement from the second content source.

2. The method of claim 1, wherein the first content source is a Content Delivery Network (CDN) entity.

3. The method of claim 1, wherein the QoE adjustment factor includes a delta value for a corresponding time interval and day, such that the delta value is applied to the first QoE measurement to estimate the second QoE measurement.

4. The method of claim 1, wherein the predictive model is determined based on a learning process to obtain delta values for time intervals and days, and, optionally, a monitoring process, that adjusts the delta values over time.

5. The method of claim 4, wherein the learning process takes periodic QoE measurements from both the first content source and the second content source including timestamp and location information.

6. The method of claim 4, wherein the learning process is performed for a plurality of regions in a network, both from the first content source and from the second content source.

7. The method of claim 4, wherein the learning process includes steps of obtaining QoE measurements from the first content source and from the second content source at various time intervals and days;
learning a performance difference between the first content source and the second content source as a function of time and location; and
adjusting the predictive model based on the performance difference.

8. The method of claim 4, wherein the learning process includes steps of
obtaining QoE measurements from the first content source and from the second content source at various time intervals and days;
determining differences between the QoE measurements; and
creating a time series with the differences.

9. The method of claim 4, wherein the learning process includes steps of
taking QoE measurements per time interval from both from the first content source and from the second content source;
calculating a difference between QoE measurements for each time internal;
creating a QoE delta time series with timestamp and QoE delta; and
building a predictive model from the QoE delta time series with parameters including a time value and QoE delta value.

10. The method of claim 9, wherein the time value is at least one of a time of day value and a day of the week value.

11. The method of claim 4, wherein the monitoring process ensures than the predictive model remains accurate over time while network behavior changes.

12. The method of claim 4, wherein the monitoring process includes steps of
periodically repeating portions of the learning process and comparing values in the predictive model and updating the predictive model based thereon.

13. The method of claim 1, wherein the QoE adjustment factor (32) is based on a region of a plurality of regions.

14. A non-transitory computer-readable medium comprising instructions that, when executed, cause one or more processors, in a user device, to perform steps of:
responsive to a recuirement to test an Over-the-Top (OTT) content ovider by one of a user, a mobile network operator, an Internet service provider, and a content delivery provider, performing a first Quality of Experience (QoE) measurement from a first content source to obtain a QoE measurement from a second content source that is the OTT content provider, wherein the first QoE measurement includes one or more of download time from the first content source, connection time to the first content source, number of stalls and their duration from the first content source, throughput from the first content source, and waiting time, wherein the second content source is different from the first content source, and wherein the second content source has user policies prohibiting repeated requests for the QoE measurements from the user device;
determining a QoE adjustment factor based on a predictive model, wherein the QoE adjustment factor includes values to adjust the first QoE measurement to accurately substitute for the QoE measurement from the second content source that is the OTT content provider, wherein the values of the QoE adjustment factor are different values for different time intervals and are monitored and adjusted over time;

adjusting the first QoE measurement using the QoE adjustment factor to obtain the second QoE measurement, the second QoE measurement reflects a QoE estimate from a second content source based on the first QoE measurement from the first content source, thereby complying with the user policies of the second content source; and providing a graphical representation of the test with the second QoE measurement as the QoE estimate instead of performing the QoE measurement from the second content source.

15. The non-transitory computer-readable medium of claim 14, wherein the first content source is a Content Delivery Network (CDN) entity.

16. The non-transitory computer-readable medium of claim 14, wherein the QoE adjustment factor includes a delta value for a corresponding time interval and day, such that the delta value is applied to the first QoE measurement to estimate the second QoE measurement.

17. The non-transitory computer-readable medium of claim 14, wherein the predictive model is determined based on a learning process to obtain delta values for time intervals and days, and, optionally, a monitoring process, that adjusts the delta values over time.

18. A processing device comprising:
one or more processors and memory storing instructions that, when executed, cause the one or more processors to
responsive to a requirement to test an Over-the-Top (OTT) content provider by one of a user, a mobile network operator, an Internet service provider, and a content delivery provider, perform a first Quality of Experience (QoE) measurement from a first content source to obtain a QoE measurement from a second content source that is the OTT content provider, wherein the first QoE measurement includes one or more of download time from the first content source, connection time to the first content source, number of stalls and their duration from the first content source, throughput from the first content source, and waiting time, wherein the second content source is different from the first content source, and wherein the second content source has user policies prohibiting repeated requests for the QoE measurements from the user device, determine a QoE adjustment factor based on a predictive model, wherein the QoE adjustment factor includes values to adjust the first QoE measurement to accurately substitute for the QoE measurement from the second content source that is the OTT content provider, wherein the values of the QoE adjustment factor are different values for different time intervals and are monitored and adjusted over time, adjust the first QoE measurement using the QoE adjustment factor to obtain a second QoE measurement, the second QoE measurement reflects a QoE estimate from the second content source based on the first QoE measurement from the first content source, thereby complying with the user policies of the second content source, and provide a graphical representation of the test with the second QoE measurement as the QoE estimate instead of performing the QoE measurement from the second content source.

19. The processing device of claim 18, wherein the first content source is a Content Delivery Network (CDN) entity.

20. The processing device of claim 18, wherein the QoE adjustment factor includes a delta value for a corresponding time interval and day, such that the delta value is applied to the first QoE measurement to estimate the second QoE measurement.

* * * * *